H. H. RIGGS.
SPEED INDICATOR.
APPLICATION FILED NOV. 18, 1918.

1,417,204.

Patented May 23, 1922.

Witnesses
Cornelia P. Dwight
Mary W. Riggs

Inventor.
Henry H. Riggs.

UNITED STATES PATENT OFFICE.

HENRY H. RIGGS, OF BOSTON, MASSACHUSETTS.

SPEED INDICATOR.

1,417,204.

Specification of Letters Patent. Patented May 23, 1922.

Application filed November 18, 1918. Serial No. 263,007.

*To all whom it may concern:*

Be it known that I, HENRY HARRISON RIGGS, a citizen of the United States, residing in Boston, in the county of Suffolk and State of Massachusetts, have invented a new and useful Speed Indicator, of which the following is a specification.

My invention is a novel form of indicator for continuously indicating the speed or rapidity of any movement, and the objects of the invention are, first, to provide an indicator simple in construction and operation and not easily deranged; second, to provide means by which the speed or rapidity of any regular movement, whether linear, rotary or reciprocal, may be continuously indicated on a dial; and third, to provide means by which the speed of motion may be indicated at any desired location, at a distance from the moving body.

Figure 1:
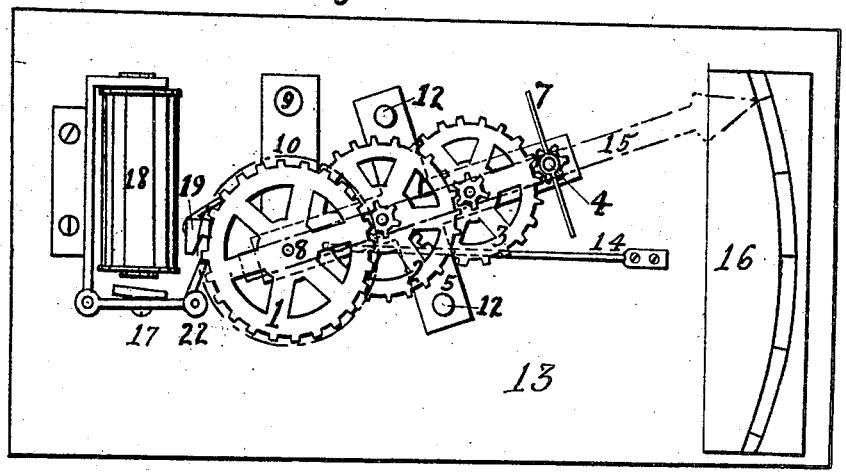
Figure 2:
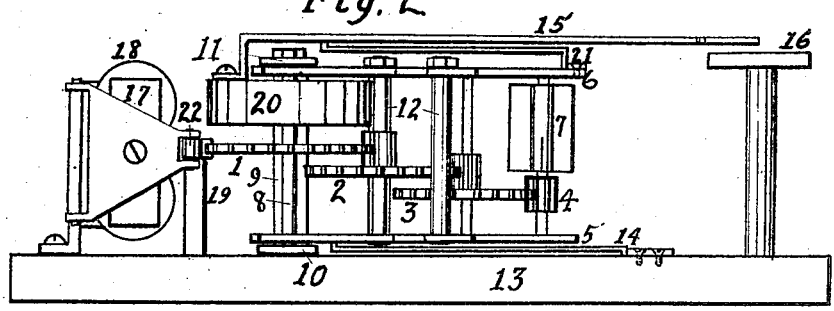

I attain these objects by means of the mechanism illustrated in the accompanying drawing, in which Fig. 1 is a plan view, the top plates, flywheel and pointer being removed, but the position of flywheel and pointer being indicated by the dot and dash lines. Fig. 2 is a side elevation, viewed from the lower side of Fig. 1.

Figure 3:
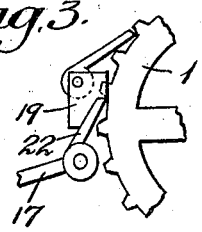

Figure 3 is a detail view showing the main wheel and pawl in the forward position of the pawl and the stop in engaging position with the pawl.

A clockwork train of gearwheels, 1, 2, 3, 4, is mounted in a frame composed of the plates 5 and 6 held and spaced apart by the posts 12. The train serves to multiply the motion of the wheel 1 and drives the fan or fly 7, whose function it is to damp and regulate speed of the train. The arbor 8, of the wheel 1, is extended at either end beyond the plates 5 and 6, forming pivots which turn in bearings in the plates 10 and 11, which are suitably supported on the post 9, which is fixed in the base 13. The train is thus free to rotate about the arbor 8 as an axis. A spring 14 normally holds the frame in such a position that the pointer, 15, which moves with the frame, points at zero on the scale 16.

It is evident that if the wheel 1 is rotated clockwise, the damping effect of the fly 7 will cause the entire frame and train to tend to rotate with the wheel 1. At the same time the spring 14 tends to return the mechanism to its normal position with the pointer at zero. This involves driving the fly 7. As the opposing force of the spring increases with the angle of deflection of the mechanism from the normal position, and the damping effect of the fly increases with its speed of rotation, it is evident that at whatever speed the wheel 1 is driven, the mechanism will assume a position which is a resultant or balance of these two tendencies, said position being absolutely determined by the speed of rotation of the wheel 1. The position of the mechanism for various speeds having been empirically determined and recorded on the scale 16, the instrument thereafter gives a continuous indication of the speed of rotation of the wheel 1.

The wheel 1 is connected in some suitable manner with the body whose motion it is desired to indicate. This may be by any of the well-known means of transmission, such as cord and pulley, gearing, worm gear, or, as shown in the drawing, by a pawl acting on the wheel 1. The pawl, 22, may be attached directly to the body whose reciprocating motion is to be indicated; or it may be mounted as shown in the drawing, on an armature 17, of an electro-magnet 18. In this case the electro-magnet is energized by an electric current through a circuit which is closed at regular intervals by the rotating or reciprocating body whose rapidity of motion is to be indicated. The indicator may thus be at any desired distance from the moving body.

In order to insure that the pawl shall advance the wheel one tooth and only one for each movement of the pawl, I provide a stop, 19, having an oblique face against which the back of the pawl 22 fits when the latter is in its advanced position. This insures that after the pawl has begun to move forward, it cannot jump over the top of a tooth on the wheel, nor can the wheel move forward by its inertia further than the distance of one tooth.

When this indicator is used in connection with any movement that drives the wheel 1 with a step-by-step movement, to neutralize the vibrating motion and keep the pointer 15 steady, I mount the pointer on a flywheel or steady mass of any convenient shape, 20. The steady-mass turns on the same axis as the wheel 1, but independently of it. The pointer 15 is connected with the plate 6 by a flexible spring 21, which normally holds the pointer parallel with the long axis of the plate 6. When the mechanism moves with a vibratory motion, the steady mass by its inertia prevents the pointer from following the vibrations, allowing it to follow only the mean position of the plate 6.

In actual practice, the wheel 1 is driven at a slow speed properly proportioned to the speed of the motion to be indicated. The scale is graduated to read directly the speed desired.

It is obvious that while some of the details of this device are also novel, its principle of action is quite independent of the details of construction. The train of wheels might be replaced by belt and pulley, worm gear, or any other convenient form of transmission; the fly might be replaced by some other form of damping, the spring 14 might be replaced by a counterweight, and the form of any of the parts might be changed without modifying the essential features of my device.

I claim as my invention, and desire to secure by Letters Patent.

1. A speed indicator having a rotary wheel, a swinging frame, an arbor on which said wheel and frame are mounted, a steady mass mounted on said arbor and rotatable independently of said wheel, a pointer carried by said steady mass and having an elastic connection with said swinging frame, a damping mechanism carried by said frame and movable bodily by said frame in an arcuate path about the axis of said wheel as a center of rotation and intermediate mechanism whereby the damping mechanism is driven by said wheel.

2. A speed indicator having a pivot and bearings, a main rotary wheel and a swinging frame, both mounted on said pivot, a steady mass mounted on the same axis as said frame and main wheel and rotating independently of said wheel, a pointer carried by said steady mass, a scale, a spring which connects said pointer with said frame so that the pointer moves with the frame, a damping mechanism mounted in said frame and movable bodily therewith, intermediate connections whereby said damping mechanism is driven by said wheel, a fixed support and a spring which connects said frame with said support and holds the frame in position for the pointer to point to the zero point on the scale when there is no rotary stress operative on said main wheel.

3. A speed indicator having a pivot and bearings therefor, a rotary wheel and a swinging frame both mounted on said pivot, a pointer having a resilient connection with said frame, a rotary steady mass mounted on the same axis as the said frame and carrying said pointer, a damping mechanism and connections whereby the said damping mechanism is driven by the said wheel, said damping mechanism being mounted in said frame and adapted to be moved bodily with said frame.

4. A speed indicator having a pivot and bearings therefor, a rotary wheel and a swinging frame both mounted on said pivot, a pointer having a resilient connection with said frame, a damping mechanism and connections whereby the said damping mechanism is rotated by the said wheel, said damping mechanism being mounted in said frame and adapted to be moved bodily with said frame, and a steady mass which is mounted on the same axis as the said wheel but which turns independently of said wheel.

5. A speed indicator having a swinging frame, a train of wheels journalled in said frame, an arbor for the first wheel of the train which is extended and forms a pivot for said frame, bearings in which said arbor is journalled, the said frame swinging on said arbor as a pivot, a fixed support, a spring which connects said swinging frame with said fixed support, a steady mass which is mounted on the same axis as the frame and the first wheel of the train but which turns independently of said wheel, a pointer carried by said steady mass, a spring which connects said pointer with said frame, a scale, and a fly connected with the said train of wheels to dampen the train.

6. A speed indicator having a scale, an oscillatable frame, an arbor on which said frame is mounted, bearings in which said arbor is mounted, a wheel mounted on said arbor and adapted to be operatively connected with the object whose speed is to be indicated, a fly wheel rotatably mounted in said frame and having driving connection with said first wheel, a steady mass oscillatably mounted on the same axis as said first wheel and rotatable independently of said first wheel, a pointer carried by said steady mass, a spring which connects said pointer with said oscillatable frame, a fixed element and a spring which connects said frame with said fixed element.

7. A speed indicator having a scale, an oscillatable frame, an arbor on which said frame is mounted, bearings in which said arbor is mounted, a main wheel mounted on said arbor and adapted to be operatively connected with the object whose speed is to be indicated, a fly wheel rotatably mounted in said frame and having driving connection with said first wheel, a steady mass which is mounted on the same axis as said first wheel but which turns independently of said first wheel, a pointer mounted on said steady mass and oscillatable therewith, a spring which yieldingly connects said pointer with said oscillatable frame, a fixed element and a spring which connects said oscillatable frame with said fixed element, and yieldingly retains the frame in such position that the pointer will point to the zero point on the scale when there is no actuating power operating on the main wheel.

8. A speed indicator having a rotary wheel, an arbor therefor, bearings for said arbor, a swinging frame, said arbor being extended and forming a pivot for said swinging frame, a steady mass mounted on the same arbor as said frame and main wheel and rotating independently of said wheel, a pointer carried by said steady mass, a spring which yieldingly connects said pointer with said frame so that the pointer moves with the frame, damping mechanism movable with said frame, connections whereby said damping mechanism is driven by said wheel, a fixed support and a spring which yieldingly connects said frame with said support in position for the pointer to point in a predetermined direction.

9. A speed indicator having a rotating member, an oscillatable member mounted on the same axis as said rotating member, a steady mass rotatable independently of said rotating member, a pointer carried by said steady mass and having a spring connection with said oscillatable member, a damping mechanism mounted on said oscillatable member and movable bodily therewith in its oscillation, and means whereby the said first mentioned rotating member drives the damping mechanism.

10. A speed indicator having a rotating member, an oscillatable member and a steady mass both mounted on the same axis as said rotating member, said steady mass rotating independently of said rotating member, a pointer carried by said steady mass and having a spring connection with said oscillatable member, and a damping mechanism mounted on said oscillatable member and movable bodily therewith in its oscillation around said axis.

HENRY H. RIGGS.